United States Patent [19]
Holmgren

[11] Patent Number: 5,192,726
[45] Date of Patent: Mar. 9, 1993

[54] BEIDELLITE CLAY AND PROCESS FOR PREPARING THE CLAY

[75] Inventor: Jennifer S. Holmgren, Bloomingdale, Ill.

[73] Assignee: UOP, Des Plaines, Ill.

[21] Appl. No.: 753,514

[22] Filed: Sep. 3, 1991

[51] Int. Cl.$^5$ .................... B01J 20/16; B01J 21/16
[52] U.S. Cl. ................................. 502/62; 502/63; 502/84
[58] Field of Search .............. 502/80, 84, 62, 63; 423/327, 328 T, 328 M

[56] References Cited

U.S. PATENT DOCUMENTS

| | | | |
|---|---|---|---|
| 3,855,147 | 12/1974 | Granquist | 423/328 M |
| 3,965,043 | 6/1976 | Stridde | 252/455 R |
| 3,979,331 | 9/1976 | Stridde | 252/441 |
| 4,176,090 | 11/1979 | Vaughan et al. | 252/455 Z |
| 4,216,188 | 8/1980 | Shabtai et al. | 423/118 |
| 4,367,163 | 1/1983 | Pinnavaia et al. | 252/455 R |
| 4,952,544 | 8/1990 | McCauley | 502/68 |

FOREIGN PATENT DOCUMENTS

2164636 3/1986 United Kingdom ............ 423/328 C

OTHER PUBLICATIONS

R. M. Barrer & L. W. R. Dicks in *J. Chem. Soc.* (A), 1966, 1379–1385.
Crystal Structures of Minerals and Their X-ray Diffraction, G. W. Brindley & G. Brown, Eds., Mineralogical Society, London, 1980.
Tsuitida & Kobayashi, *J. Chem. Soc. Japan* (Pure Chem Sect.) 64,1268 (1943).
Inoue, Osugi & Kanaji, J. Chem. Soc. Japan (Ind. Chem. Sec.), 61, 407 (1958).
Clays and Clay Minerals, 27, 119 (1979).

*Primary Examiner*—Carl F. Dees
*Attorney, Agent, or Firm*—Thomas K. McBride; Eugene I. Snyder; Frank S. Molinaro

[57] ABSTRACT

This invention relates to a novel beidellite layered clay, a process for preparing the clay and a process using the clay. The clay is characterized in that it is substantially free of sodium cations, is composed of crystals whose average crystallites size is about 50–150 Angstroms, has a surface area of at least 80 m$^2$/g and has its 060 X-ray diffraction peak at a d-spacing of 1.50 Angstroms. The clay is prepared from a reaction mixture containing reactive sources of aluminum and silicon, a templating agent and water. Examples of templating agents are quaternary ammonium compounds such as tetramethylammonium hydroxide. Reactive source of aluminum and silicon include boehmite alumina and colloidal silica. The mixture is reacted at a pH of about 8.5 to about 14, a temperature of about 150° to about 210° C. for a time of about 1 to about 20 days. The clay composition may be used as is or after pillaring to catalyze hydrocarbon conversion processes such as alkylation.

11 Claims, No Drawings

BEIDELLITE CLAY AND PROCESS FOR PREPARING THE CLAY

FIELD OF THE INVENTION

This invention relates to a novel beidellite layered clay (one of the smectite clays) composition, a process for preparing the clay, and a process using the clay. The clay is characterized in that it has crystals whose average crystallite size is about 50-150 Angstroms, has a surface area of at least 80 m$^2$/g, has its 060 X-ray diffraction peak at a d-spacing of 1.50 Angstroms and is substantially free of sodium cations. The clay is prepared from a reaction mixture containing reactive sources of aluminum and silicon, a templating agent and water.

BACKGROUND OF THE INVENTION

Naturally occurring clays such as dioctahedral smectites are composed of semicrystalline aluminosilicate layers (lamellae) held together by Van der Waals and electrostatic forces. Anionic charges on the siliceous layers are neutralized by cations in the interlamellar spaces. These cations are usually sodium, calcium, or potassium. When these cations are large oligomers of inorganic cations such as Fe$^{+3}$, Cr$^{+3}$ or when they are metal hydroxy polymer cations such as [Al$_{13}$O$_4$-(OH)$_{24}$(H$_2$O)$_{12}$]$^{7+}$ or [Zr(OH)$_2$.4H$_2$O]$_4$$^{8+}$, they act as pillars, propping the clay layers apart to afford a pillared layered clay. Upon heating, these oligomers or polymers are converted to the metal oxide, thus preventing the collapse of the clay layers and thus pillaring the clay.

These smectite clays are known to catalyze reactions such as alkylation, cracking, ester formation, dimerization, oligomerization, etc. However, because the naturally occurring clays have a large variation in impurity content, industrial demand for the natural smectites has been very limited. Therefore, attempts have been made to synthesize some of these smectite clays. For example, European Patent Application 163560 discloses a method of preparing a beidellite clay (one of the smectite clays). The process involves taking a mixture containing aluminum nitrate, tetraethylorthosilicate (TEOS), sodium carbonate and sodium hydroxide, drying the mixture and then calcining to give aluminum oxide, silicon oxide, and sodium oxide, adding to that hydroxide anions and heating the resultant slurry to a temperature of about 340° C. for 14 days. Although this method produces a beidellite that is purer than the naturally occurring beidellite, the use of oxides leads to incomplete reaction even though the synthesis is carried out at high temperatures. Additionally, the presence of sodium is detrimental to the catalysis of certain reactions and therefore, the sodium has to be replaced by some other cation.

Applicant has solved the problems with the synthesis of beidellite found in the prior art by using a reaction mixture which contains a secondary or tertiary amine, a quaternary ammonium salt or a quaternary phosphonium salt along with reactive sources of aluminum and silicon. For example, tetramethylammonium hydroxide is mixed with alumina and colloidal silica along with water at a pH of about 8.5 to about 14 and reacted at a temperature of 150°-210° C. for about 1 to 20 days to provide a TMA$^+$-beidellite. The resultant product is also unique in that unlike the beidellites which are described in the prior art, the instant product has crystals whose average crystallite size is about 50-150 Angstroms, has a surface area of at least 80 m$^2$/g, is substantially free of sodium cations and has its 060 X-ray diffraction peak at a d-spacing of 1.50 Angstroms. The tetramethylammonium cations have taken the place of sodium cations that are present in prior art beidellite products. Although the prior art shows that a sodium beidellite can be exchanged with an alkyl ammonium compound the resultant exchange product does not have the same characteristics as the instant composition.

Although the prior art shows that quaternary ammonium compounds can be used to prepare some synthetic clays, there is no indication that an amine, a quaternary ammonium compound or a quaternary phosphonium compound could be used to prepare a synthetic beidellite. For example, R. M. Barrer and L. W. R. Dicks in *J. Chem. Soc.* (A), 1967, 1523-1529, have shown that alkyl ammonium compounds can be used to synthesize montmorillonites and hectorites. Thus, applicant is the first to synthesize an alkyl ammonium beidellite having small crystallites, a large surface area and its 060 peak at a d-spacing of 1.50 Angstroms.

SUMMARY OF THE INVENTION

This invention relates to a clay composition, a method of preparing the composition, and a method of using the composition. Accordingly, one embodiment of the invention is a beidellite layered clay composition having the empirical formula

$$A_x[Al_4](Si_{8-x}Al_x)(O_{20})(OH_4)$$

where A is a templating agent and x is the moles of the templating agent and varies from about 0.1 to about 2.0, the composition characterized in that it has crystals whose average crystallite size is about 50-150 Angstroms, has a surface area of at least 80 m$^2$/g, has its 060 X-ray diffraction peak at a d-spacing of 1.50 Angstroms and is substantially free of sodium cations.

Another embodiment of the invention is a process for preparing a beidellite layered clay composition having the empirical formula

$$A_x[Al_4](Si_{8-x}Al_x)(O_{20})(OH_4)$$

where A is a templating agent and x is the moles of the templating agent and varies from about 0.1 to about 2.0, the composition characterized in that it has crystals whose average crystallite size is about 50-150 Angstroms, has a surface area of at least 80 m$^2$/g, has its 060 X-ray diffraction peak at a d-spacing of 1.50 Angstroms and is substantially free of sodium cations, the process comprising providing a reaction mixture at reaction conditions and for an effective time to produce the composition, the reaction mixture comprised of reactive sources of aluminum and silicon, a templating agent and water, the reaction mixture expressed in terms of molar ratios by the formula

$$aR:ySiO_2:zAl_2O_3:bH_2O$$

where R is at least one templating agent, a is the moles of R and is chosen such that the ratio of a:y varies from about 1 to about 20, y is the moles of SiO$_2$ and varies from about 6.6 to about 7.8, z is the moles of Al$_2$O$_3$ and varies from about 2.1 to about 2.7 and b is the moles of water and varies from about 40 to about 500.

Yet another embodiment of the invention is a hydrocarbon conversion process comprising contacting a hydrocarbon feed under hydrocarbon conversion conditions with a catalyst to give a hydroconverted product, the catalyst comprising a beidellite layered clay composition having the empirical formula

where A is a templatiNg agent and x is the mole fraction of the templating agent and varies from about 0.1 to about 2.0, the composition characterized in that it has crystals whose average crystallite size is about 50–150 Angstroms, has a surface area of at least 80 m$^2$/g, has its 060 X-ray diffraction peak at a d-spacing of 1.50 Angstroms and is substantially free of sodium cations.

Other objects and embodiments will become more apparent after a more detailed description of the invention.

DETAILED DESCRIPTION OF THE INVENTION

As stated, this invention relates to a clay composition, a method of preparing the clay composition and a process using the composition. The composition of the present invention is a beidellite clay. Beidellite is one of the smectite clays that has the empirical formula

A is a templating agent and/or a counter ion and traditionally has been an alkali metal. However, in the beidellite compositions of this invention A is not an alkali metal but is chosen from the group consisting of secondary and tertiary amines, quaternary ammonium ions, quaternary phosphonium ions and mixtures thereof. Specifically the amines and quaternary ions specified below which are used to prepare the beidellite are present in the final clay composition of this invention. Finally, x is the moles of A and varies from about 0.1 to about 2.0. Other characteristics of the beidellite composition of this invention will be described hereinafter.

The composition of the instant invention is prepared from a reaction mixture which contains reactive sources of aluminum and silicon, a templating agent and water. The reaction mixture is expressed in terms of molar ratios by the formula aR:ySiO$_2$:zAl$_2$O$_3$:bH$_2$O r19re R is at least one templating agent, a is the moles of R and is chosen such that the ratio of a:y varies from about 1 to about 20, and preferably from about 5 to 10, y is the moles of SiO$_2$ and varies from about 6.6 to about 7.8, z is the moles of Al$_2$O$_3$ and varies from about 2.1 to about 2.7 and b is the moles of water and varies from about 40 to about 500.

The templating agents which can be used in preparing the clay composition of this invention are secondary and tertiary amines, quaternary ammonium or quaternary phosphonium compounds, the latter two compounds having the formula R'$_4$M+X− where R' is an alkyl group containing from 1 to 8 carbon atoms or an aryl group, M is nitrogen or phosphorus and X is carbonate, hydroxyl or halide. The quaternary ammonium compounds are preferred and especially preferred are the quaternary ammonium hydroxides. Illustrative of the quaternary compounds which can be used as templating agents are the hydroxide, carbonate, chloride, bromide, fluoride and iodide salts of the following cations: tetramethylammonium; tetraethylammonium; tetrapropylammonium; tetrabutylammonium; tetra-t-butylammonium; tetrapentylammonium; tetraphenylammonium; tetramethylphosphonium; tetraethylphosphonium; tetrapropylphosphonium and tetraphenylphosphonium. Illustrative of the secondary and tertiary amines which can be used are di-n-propylamine, ethylbutylamine, tripropylamine, triethylamine, piperidine, 2-methylpyridine, di-n-pentylamine, choline, and N,N-dimethylbenzylamine. It should be pointed out that mixtures of templating agents can also be used to prepare compositions of this invention. The amount of templating agent that is necessary is determined by the amount of silicon present in the mixture. It is necessary that the ratio of the moles of templating agent to the moles of silicon in the mixture vary from about 1 to about 20 and preferably from about 5 to about 10.

Another necessary component of the reaction mixture is a reactive source of aluminum. By reactive is meant a compound that is not fully condensed. That is the compound still contains one or more hydroxide groups or is hydrated. Illustrative examples of reactive sources of aluminum include boehmite alumina, gibbsite alumina, aluminum hydroxide, aluminum alkoxides and mixtures thereof. If aluminum hydroxide is used it is preferred to use freshly prepared aluminum hydroxide. Specific examples of aluminum alkoxides include aluminum isopropoxide and aluminum t-butoxide. A further necessary component of the reactive mixture is a reactive sources of silicon. Illustrative of the reactive sources of silicon are colloidal silica, silicon alkoxide and mixtures thereof. Specific examples of silicon alkoxides include tetraethylorthosilicate and tetramethylorthosilicate. The ratio of silicon to aluminum in the reaction mixture can vary widely but for convenience is chosen to be from about 0.01 to about 20 and preferably from about 0.2 to about 10.

Having formed the reaction mixture, it is reacted at reaction conditions for an effective time to provide the desired composition. The reaction conditions necessary to produce the desired beidellite clay include a basic pH, i.e., greater than pH 7 and preferably from about 8.5 to about 14. A basic pH is necessary to transport or mineralize the SiO$_2$ and to solubilize the reactants. It should be pointed out that the higher the silicon to aluminum ratio the the pH that is required to provide the desired product at a reasonable rate. The pH of the mixture is controlled by adding ammonium hydroxide to the mixture or adding more templating agent. In addition to a basic pH, it is also necessary to carry out the reaction at an elevated temperature from about 150° C. to about 210° C. and preferably from about 175° C. to about 200° C. Finally the reaction mixture is reacted under the above described reaction conditions at an effective time which ranges from about 1 to about 20 days in order to produce the desired beidellite smectite clay.

As stated the beidellite clay that is obtained by the above described procedure is characterized in that it is composed of crystals whose average crystallize size is about 50–150 Angstroms. The average crystallize size is determined from the X-ray diffraction pattern of the composition. The apparent crystallize length in the (hkl) direction, L$_{hkl}$, can be calculated from the Scherrer equation $$L_{hkl} = \frac{0.9\lambda}{\beta_{hkl}\cos\Theta_{hkl}}$$

where $\lambda$ is the X-ray wavelength, $\beta_{hkl}$ is the full width at half-maximum for the peak corrected for instrumental broadening and $\Theta_{hkl}$ is the diffraction angle. It also has a surface area of at least 80 m²/g and is substantially free of sodium cations. By substantially free is meant that less than 0.2 weight percent sodium is present in the composition. The source of these sodium atoms are impurities in the starting materials. Finally the instant clay composition has its 060 X-ray diffraction peak at a d-spacing of 1.50 Angstroms.

One way by which clays can be characterized is by their X-ray diffraction patterns. In general, di- and tri-octahedral clays can be characterized by the value of their b-parameter. The b-parameter, which is related to the repeat unit length in the octahedral layer, can be determined from the position of the 060 reflection. For dioctahedral minerals this reflection has spacings between 1.48-1.50 Angstroms whereas for trioctahedral minerals it is between 1.53-1.55 Angstroms. See Crystal Structures of Minerals and their X-ray Diffraction, G. W. Brindley and G. Brown, Eds, Mineralogical Society, London, 1980.

The prior art discloses that beidellite has its 060 peak at a d-spacing of 1.49 Angstroms. However, the beidellite prepared according to this invention has its 060 peak at a d-spacing of 1.50 Angstroms. This indicates that the beidellite of the present invention is different from that described in the prior art.

The beidellite clay composition of this invention can be used as is or it can be pillared to catalyze various hydrocarbon processes. It is preferred to catalyze the various hydrocarbon process with a pillared beidellite clay. The clay can be pillared using methods well known in the art. Examples of pillars which are well known in the art are alumina, rare earth containing alumina, $ZrO_2$, $TiO_2$, $Cr_2O_3$, $SiO_2$ and Si/Al (silica/alumina). As stated, these pillars are introduced by combining the clay with an oligomer or polymer of the desired cation or mixture of cations at reaction conditions. For example, alumina pillars may be introduced by using aluminum chlorohydrate. Aluminum chlorohydrate (also known as aluminum chlorohydroxide) is a polymeric metal complex having the empirical formula

$$Al_{2+n}(OH)_{2n}Cl_6$$

where n has a value of about 4 to 12. The preparation of this aluminum polymer is generally known to those skilled in the art. See, for example: Tsuitida and Kobayashi, J. Chem. Soc. Japan (Pure Chem. Sect.), 64, 1268 (1943). Inoue, Osugi and Kanaji, J. Chem. Soc. Japan (Ind. Chem. Sec.), 61, 407 (1958).

A rare earth ACH is an ACH as described above which is modified to include one or more rare earth elements such as cerium, lanthanum, neodymium, europium, etc (all U.S. Pat. No. 4,952,544 which is incorporated by reference). The ACH polymer is modified with the rare earth by adding a soluble rare earth salt, preferably a water soluble rare earth salt. Examples of rare earth salts are the nitrates, halides, sulfates and acetates. Preferred rare earth elements are cerium and lanthanum with cerium nitrate and lanthanum nitrate being the preferred salts. The rare earth is introduced into the polymer or oligomer structure by mixing the rare earth salt either in solution (water preferred) or as a solid with the ACH. The mixture is refluxed at a temperature of about 105° to about 145° C. for a time of about 24 to about 100 hours. The molar ratio of rare earth (expressed as oxide, e.g., $CeO_2$) to alumina ($Al_2O_3$) in the solution prior to refluxing is from about 1:52 to about 1:1.

Descriptions of oligomers or polymers of the other pillaring materials can be found in the following references: 1) Si/Al—U.S. Pat. No. 4,176,090; 2) zirconia-Clays and Clay Minerals, 27, 119 (1979) and U.S. Pat. No. 4,176,090; 3) titania—U.S. Pat. No. 4,176,090; 4) chromium oxide—U.S. Pat. No. 4,216,188 and 5) silicon oxide—U.S. Pat. No. 4,367,163, all of which are incorporated by reference.

These pillared clays are prepared by means well known in the art such as adding the beidellite clay to a solution containing a pillar precursor, i.e., oligomer or polymer, stirring, filtering, redispersing with water (one or more times), isolating, drying and calcining at about 300° to about 800° for a time sufficient to fix the structure (preferably about 3 hours).

As stated, beidellite clay compositions are used to catalyze hydrocarbon conversion processes such as alkylation, cracking, hydrocracking, ester formation, dimerization, oligomerization, etc. It is particularly preferred to use the clay compositions of this invention whether pillared or non-pillared to catalyze alkylation and hydrocracking processes. The conditions necessary to carry out alkylation of aromatic compounds are well known and are disclosed, for example, in U.S. Pat. Nos. 3,965,043 and 3,979,331 which are incorporated by reference. Generally the process can be carried out in a batch type or a continuous type operation. In a batch type process, the catalyst, aromatic compound and alkylating agent are placed in an autoclave and the pressure increased, if necessary, in order to effect the reaction in the liquid phase. An excess amount of aromatic compound should be present, preferably in a range of about 2:1 to about 20:1 moles of aromatic compound per mole of alkylating agent. The reaction is carried out at an elevated temperature since the rate of alkylation is undesirably low at room temperature. Preferably the temperature is in the range of about 40° to about 200° C. The process is carried out for a time of about 0.5 to about 4 hours, after which the product is separated from the starting materials by conventional means.

If it is desired to carry out the process in a continuous manner, the catalyst is placed in a reactor which is heated to the desired operating temperature and the pressure increased above atmospheric, if necessary. The aromatic compound and alkylating agent are flowed over the catalyst bed at a predetermined liquid hourly space velocity sufficient to effect alkylation. The effluent is continuously withdrawn and conventional separation means used to isolate the desired product.

Hydrocracking conditions typically include a temperature in the range of 400° to 1200° F. (204°-649° C.), preferably between 600° and 950° F. (316°-510° C.). Reaction pressures are in the range of atmospheric to about 3,500 psig (24, 132 kPa g), preferably between 200 and 3000 psig (1379-20,685 kPa g). Contact times usually correspond to liquid hourly space velocities (LHSV) in the range of about 0.1 hr⁻¹ to 15 hr⁻¹, preferably between about 0.2 and 3 hr⁻¹. Hydrogen circulation rates are in the range of 1,000 to 50,000 standard cubic feet (scf) per barrel of charge (178-8,888 std. m³/m³), preferably between 2,000 and 30,000 scf per barrel of charge (355-5,333 std. m³/m³). Suitable hydrotreating conditions are generally within the broad ranges of hydrocracking conditions set out above.

The reaction zone effluent is normally removed from the catalyst bed, subjected to partial condensation and vapor-liquid separation and then fractionated hydrogen, and if desired some or all of the unconverted heavier materials, are recycled to the reactor. Alternatively, a two-stage flow may be employed with the unconverted material being passed into a second reactor. Catalysts of the subject invention may be used in just one stage of such a process or may be used in both reactor stages.

Catalytic cracking processes are preferably carried out with the clay composition using feedstocks such as gas oils, heavy naphthas, deasphalted crude oil residua, etc. with gasoline being the principal desired product. Temperature conditions of 850° to 1100° F., LHSV values of 0.5 to 10 and pressure conditions of from about 0 to 50 psig are suitable.

The following examples are presented in illustration of this invention and are not intended as undue limitations on the generally broad scope of the invention as set out in the appended claims.

EXAMPLE 1

In a container 30 g of tetramethylammonium hydroxide (TMAOH) were dissolved in 260 g of water. To this solution there were added 6.6 g of ALOOH. The slurry was mixed until homogeneous. While stirring rapidly, 16.5 g of colloidal silica which has been ammonia stabilized (available from DuPont Inc. and identified as Ludox TM AS-40) were added. The slurry was stirred until homogeneous and then aged quiescently under autogenous pressure in a Parr Reactor (125 cc) for 2 days at 200° C. The product was collected by centrifugation and washed with water until the residual TMAOH was removed. The product was then dried at 110° C. for 16 hours. XRD characterization of the product showed it to be beidellite. The surface area of the composition as determined by the B.E.T. method was 100 m$^2$/g.

EXAMPLE 2

The procedure set forth in Example 1 was followed using 33.2 g of Ludox TM AS-40. The slurry was aged for 5 days at 200° C. XRD characterization of the product showed it to be beidellite. The surface area of the composition as determined by the B.E.T. method was 100 m$^2$/g.

EXAMPLE 3

The procedure set forth in Example 1 was followed using 23 g of aluminum isopropoxide instead of the AlOOH. The slurry was aged for 2 days at 200° C. XRD characterization of the product showed it to be beidellite.

EXAMPLE 4

The procedure set forth in Example 1 was followed using 30.1 g of tetraethylorthosilicate (TEOS). The slurry was aged for 2 days at 200° C. XRD characterization of the product showed it to be beidellite. The surface area of the composition as determined by the B.E.T. method was 120 m$^2$/g.

EXAMPLE 5

The procedure set forth in Example 1 was followed using 10 g of TMAOH and 12 g of TMACl instead of the 30 g of TMAOH. The slurry was aged for 10 days at 200° C. XRD characterization of the product showed it to be beidellite.

EXAMPLE 6

The procedure set forth in Example 1 was followed using 30 g of TMAHCO$_3$. The slurry was aged for 10 days at 200° C. XRD characterization of the product showed it to be beidellite.

EXAMPLE 7

A solution of 12 g of ACH solution (Reheis TM) in 500 g of water was prepared. To this solution there were added 10 g of the TMA-beidellite clay prepared in Example 1. The slurry was heated to 60° C. and aged with stirring for 2 hours. After cooling to room temperature, the clay was recovered by centrifugation and washed with water until substantially chloride free. The product was dried at 60° C. for 16 hours. The sample was characterized by its X-ray diffraction pattern which showed a d$_{(001)}$ spacing of 18.9 Angstroms and by N$_2$ adsorption which showed a BET surface area of 265 m$^2$/g.

The cracking activity of this pillared clay was determined using the following heptene cracking test. The heptene cracking test uses an electrically heated reactor which is loaded with 125 mg of 40-60 mesh (420-250 microns) particles of the catalyst to be tested. The catalyst was dried in situ for 30 minutes at 200° C. using flowing hydrogen, and then subjected to a reduction treatment of 425° C. in flowing hydrogen for one hour. The temperature of the reactor was then adjusted to 425° C. (inlet). The feed stream used to test the catalyst consists of hydrogen gas which is saturated with 1-heptene at 0° C. and atmospheric pressure. The feed stream was flowed over the catalyst at a flow rate of 125 cc/min. The effluent gas stream was analyzed using a gas chromatograph in order to calculate weight percent cracked product. Cracked product is product that has a lower molecular weight than the starting 1-heptene hydrocarbon.

The ACH pillared beidellite had a cracking activity of 65 weight percent.

The clay from Example 2 was pillared according to the procedure of Example 7 and was tested using the heptene cracking test and showed a cracking activity of 52 weight percent.

I claim as my invention:

1. A beidellite layered clay composition having the empirical formula

$$A_x[Al_4](Si_{8-x}Al_x)(O_{20})(OH_4)$$

where A is a templating agent and x is the moles of the templating agent and varies from about 0.1 to about 2.0, the compostion characterized in that it has crystals whose average crystallite size is about 50-150 Angstroms, has a surface area of at least 80 m$^2$/g, has its 060 X-ray diffraction peak at a d-spacing of 1.50 Angstroms and is substantially free of sodium cations.

2. The composition of claim 1 where the clay layers are separated by pillars selected from the group consisting of alumina, rare earth containing alumina, ZrO$_2$, TiO$_2$, Cr$_2$O$_3$, SiO$_2$ and silica/alumina.

3. The composition of claim 2 where the pillar is alumina.

4. The composition of claim 2 where the pillar is a rare earth containing alumina.

5. The composition of claim 1 where A is selected from the group consisting of secondary amines, tertiary amines, quaternary ammonium ions, quaternary phosphonium ions and mixtures thereof.

6. The composition of claim 5 where the quaternary ammonium ions are selected from the group consisting of tetramethylammonium ion, tetraethylammonium ion tetrapropylammonium ion, tetrabutylammonium ion, tetra-t-butylammonium ion, tetrapentylammonium ion, tetraphenylammonium ion and mixtures thereof.

7. A process for preparing a beidellite layered clay composition having the empirical formula $$A_x[Al_4](Si_{8-x}Al_x)(O_{20})(OH_4)$$

where A is a templating agent and x is the moles of the templating agent and varies from about 0.1 to about 2.0, the composition characterized in that it has crystals whose average crystallite size is about 50–150 Angstroms, has a surface area of at least 80 m²/g, has its 060 X-ray diffraction peak at a d-spacing of 1.50 Angstroms and is substantially free of sodium cations, the process comprising providing a reaction mixture at reaction conditions and for an effective time to produce the composition, the reaction mixture comprised of reactive sources of aluminum and silicon, a templating agent and water, the reaction mixture expressed in terms of molar ratios by the formula $$aR:ySiO_2:zAl_2O_3:bH_2O$$

where R is at least one templating agent, a is the moles of R and is chosen such that the ratio of a:y varies from about 1 to about 20, y is the moles of $SiO_2$ and varies from about 6.6 to about 7.8, z is the moles of $Al_2O_3$ and varies from about 2.1 to about 2.7 and b is the moles of water and varies from about 40 to about 500.

8. The process of claim 7 where the reaction conditions are a pH of about 8.5 to about 14 and a temperature of about 150° to about 210° C.

9. The process of claim 7 where the mixture is reacted for a time of about 1 to about 20 days.

10. The process of claim 7 where the templating agent, R, is selected from the group consisting of secondary amines, tertiary amines, quaternary ammonium compounds, quaternary phosphonium compounds and mixtures thereof, the quaternary compounds having the formula $R'_4M^+X^-$, where $R'$ is an alkyl group containing from 1 to 8 carbon atoms or an aryl group, M is nitrogen or phosphorus and X is hydroxyl, carbonate or halide.

11. The process of claim 7 where the templating agent, R, is a quaternary ammonium compound selected from the group consisting of tetramethylammonium salts, tetraethylammonium salts, tetrapropylammonium salts, tetrabutylammonium salts, tetra-t-butylammonium salts, tetrapentylammonium salts, tetraphenylammonium salts and mixtures thereof.

* * * * *

UNITED STATES PATENT AND TRADEMARK OFFICE
CERTIFICATE OF CORRECTION

PATENT NO. : 5,192,726
DATED : March 9, 1991
INVENTOR(S) : JENNIFER S. HOLMGREN

It is certified that error appears in the above-indentified patent and that said Letters Patent is hereby corrected as shown below:

In column 2, line 31, change "$(OH_4)$" to "$(OH)_4$".

In column 2, line 45, change "$(OH_4)$" to "$(OH)_4$".

In column 3, line 7, change "$(OH_4)$" to "$(OH)_4$".

In column 3, line 29, change "$(OH_4)$" to "$(OH)_4$".

In column 8, line 50, change "$(OH_4)$" to "$(OH)_4$".

In column 9, line 12, change "$(OH_4)$" to "$(OH)_4$".

Signed and Sealed this

Twenty-first Day of June, 1994

Attest:

BRUCE LEHMAN

*Attesting Officer*   *Commissioner of Patents and Trademarks*